(12) United States Patent
Henderson

(10) Patent No.: US 6,724,867 B1
(45) Date of Patent: Apr. 20, 2004

(54) METHOD AND APPARATUS FOR AUTOMATIC MESSAGE TRANSFER FROM A REMOTE MESSAGING SYSTEM TO A LOCAL COMMUNICATION DEVICE

(76) Inventor: Daniel A. Henderson, 108 Dustin Cir., Weatherford, TX (US) 76087

( * ) Notice: Subject to any disclaimer, the term of this patent is extended or adjusted under 35 U.S.C. 154(b) by 0 days.

(21) Appl. No.: 09/412,250

(22) Filed: Oct. 5, 1999

Related U.S. Application Data

(60) Provisional application No. 60/103,248, filed on Oct. 6, 1998.

(51) Int. Cl.$^7$ ................................................. H04M 1/64
(52) U.S. Cl. ..................... 379/88.22; 379/67.1; 379/68; 379/82; 379/88.12; 379/88.18; 379/88.25
(58) Field of Search ....................... 379/67.1, 68, 88.13, 379/88.22, 88.23, 88.25, 88.18, 905, 908, 69, 70, 74, 77, 79, 82, 88.12, 88.17, 88.24

(56) References Cited

U.S. PATENT DOCUMENTS

| | | | |
|---|---|---|---|
| 5,394,445 A | * 2/1995 | Ball et al. | 379/67.1 |
| 5,444,768 A | * 8/1995 | Lemaire et al. | 379/68 |
| 5,521,964 A | * 5/1996 | Schull et al. | 379/67 |
| 5,652,789 A | * 7/1997 | Miner et al. | 379/201 |
| 5,675,507 A | * 10/1997 | Bobo, II | 364/514 R |
| 5,742,905 A | * 4/1998 | Pepe et al. | 455/461 |
| 5,822,405 A | * 10/1998 | Astarabadi | 379/88 |
| 5,946,386 A | * 8/1999 | Rogers et al. | 379/265 |
| 6,233,318 B1 | * 5/2001 | Picard et al. | 379/88.17 |
| 6,483,905 B1 | * 11/2002 | Kikinis | 379/93.24 |

* cited by examiner

Primary Examiner—Allan Hoosain
(74) Attorney, Agent, or Firm—Richard K Robinson

(57) ABSTRACT

The system comprises an off-premises voice or fax mail system and an on-premises CPE device that can periodically interrogate the telephone line to monitor for signals indicating that a voice or fax message has been received at the off-premises message system. The on-premises CPE device contains, or is connectable to, an incoming message storage means, an automatic dialing means, a message counter means, and a means for establishing an off-hook/on-hook condition with the telephone line. When a call comes in while the telephone line is busy, the call is directed to an off-premises message center where a message is stored. Then, the central office of the telephone network generates a special signal such as a stutter dial tone to be transmitted to the called party location upon the next off-hook condition after the previous call has been completed. Upon detection of a special signal generated on the telephone line that indicates a message has been received, the CPE device automatically establishes communication with the message system, and retrieves the message for storage and later review by the called party at the CPE device. If the called party happens to go off-hook during this automatic operation, the called party can monitor the message received while recording the message or can listen to the message and stop recording/transfer of the message while the CPE device is returned to a standby condition. Alternatively, a called party hookswitch at the CPE can be disabled until the message recording/transfer is complete.

18 Claims, 4 Drawing Sheets

METHOD AND APPARATUS FOR AUTOMATIC MESSAGE TRANSFER FROM A REMOTE MESSAGING SYSTEM TO A LOCAL COMMUNICATION DEVICE

CROSS-REFERENCE TO RELATED APPLICATIONS

This application claims the benefit of U.S. Provisional Patent Application Ser. No. 60/103,248; filed Oct. 6, 1998, entitled Method and Apparatus for Automatic Message Transfer from a Remote Messaging System to a Local Communication Device.

BACKGROUND OF THE INVENTION

1. Field of the Invention

This invention relates generally to landline voice communication systems and particularly to Premises Equipment telephone answering machines and Central Office or non-customer premises voice mail systems.

Voice mail systems and answering machine systems are well known and widely popular due to the increasingly mobile nature of communicants.

Two major approaches are now commonly utilized to automatically answer the telephone for a called party while they are out of the office.

The first conventional approach is with a voice mail center located off premises from the called party, typically at a Local Exchange of the Central Office for the telephone company providing service between the calling and called communicant Voice or fax mail services are typically provided for a monthly fee to called communicants.

The benefit of this approach is that when a called party does not answer an incoming call, the call is rerouted to the voice mail center where the caller may leave a voice message for the called party in a private voice mail box. Meanwhile, the called party telephone line is immediately placed in an on-hook condition so that the called party may immediately receive another phone call. Even in the case where the called party telephone line is busy, the central office can detect a busy condition at the customer premises and can automatically route the subsequent caller to a voice messaging center, again typically located at a central office of the telephone company. These systems tend to be inconvenient for a called party in that the called party must manually call in to a voice mail center, enter voice mailbox number and pin data, and listen to the voice messages received. Another limitation in these types of systems is that it is often difficult to retrieve and store at the customer premises any voice messages left at the voice mail center.

The second conventional approach for voice messaging is with a telephone answering machine located at the customer premises and connected to the telephone line. The advantage of this approach is that no monthly charges are incurred from the telephone company and a wide range of features are available that are not ordinarily found in voice mail systems located off-premises. For example, popular voice/fax/modem cards may be installed in a bus of a personal computer, adapted to receive telephone calls and store voice and other message data in memory or on a DASD of the computer for archival or later review. Other stand-alone devices offer features such as caller id logging, integrated telephones etc. that are not available from the conventional voice mail center located off-premises are commonly available in stand-alone TAD or PC-based voice modem.

The disadvantage of these CPE based voice message devices is that, particularly in a POTS environment, when the line is busy, a calling party cannot leave a message. This can also be a problem, albeit occurring less frequently, in so-called "voice-view" type systems or ISDN systems. Typically, the calling party hears a busy signal. This is inconvenient in that the calling party must then call again later, and in the case of an urgent or time sensitive message, it may not be practical to convey urgent information at a later time. Because many people now conduct businesses from their home rather than a location with an operator and a central switchboard through a PBX, the frequency and volume of calls received often creates the potential for a caller receiving a busy signal more often than is desirable.

Many users now employ both types of voice messaging systems in combination to better meet their needs. By using a conventional TAD at the customer premises, a called party can have greater functionality and more control over the access and storage of voice and other message types, such as facsimile or e-mail communication, otherwise known as integrated messaging. These users also have voice mail or fax mail provided by the telephone office, which can relieve callers of the inconvenience of hearing a busy signal and enable those callers to leave a message even when the called party location is off-hook.

The disadvantage of the above combined solution is that the called party must then check two different locations for messages, particularly when away from the office. This can be very time consuming to the called party because the operation requires two call-in operations, two sets of PIN access codes, and two separate locations where disparate voice or other messages are stored.

In the case where a called party uses an ISDN type service, the problem is somewhat alleviated in that separate data channels may be used to simultaneously receive more than one telephone call at a time at a CPE device, such as an answering or facsimile machine. However, it is still conceivable that a called party could be using all the available data channels at the same time, thereby causing a caller to receive a busy signal or be transferred to a voice mail system off premises. It then becomes necessary for a called party to manually call up and retrieve voice messages from an off-premises voice mail system after they happen to notice a stutter dial tone or flashing indicator, or for a caller to have a place to call again when there is not a busy signal present.

2. Description of the Prior Art

In U.S. Pat. No. 5,280,523 issued to Lee is shown a telephone line messaging waiting and ring indicator for visually indicating that a telephone is ringing or that a message is waiting.

In U.S. Pat. No. 5,243,642 issued to Wise, Jr. et al., is shown a CPE device that issues a visual notification for a called party to alert them of a voice message received. The called party can then know to call-in to listen to the voice message stored at a voice message center.

In U.S. Pat. No. 4,582,959 issued to Zimmerman et al. is shown a method and apparatus for a telephone message announcing device to check a remote telephone voice message system and notify a called party of the presence of messages stored at the system. The device further assists the called party in connecting with the system to listen to messages.

In U.S. Pat. No. 5,172,404 issued to Hashimoto is shown a system for coupling a telephone answering device and voice mail system together such that when a TAD becomes full from incoming messages, the TAD can call the voice mail center and transfer the stored incoming messages to the voice mail center, thus allowing the TAD to then receive more voice messages without overwriting previous messages received. However, no method is shown for automatically transferring messages from the voice mail system to the TAD in response to detecting a particular dial tone signature that would indicate a new message has been received.

In U.S. Pat. No. 5,327,493 issued to Richmond et al. is shown a device for periodically interrogating the telephone line and detecting tones, such as a stuttered dial tone indicating a message waiting at a voice mail center, and activating a visual indicator in response to a detection. The visual indicator can inform the called party to call the voice mail center to retrieve messages received in their absence.

However, none of the above prior art addresses the need for an automatic means to transfer voice messages from a voice or fax mail center to a conventional TAD for local or remote retrieval by a called party.

Needed is a method that can allow a called party to receive all voice and other messages received in a central location in a timely and automatic manner so that they may more readily respond to incoming messages received.

In such a method, callers could be assured of more rapid retrieval of their message by the called party and the called party is relieved from having to periodically interrogate the line for a stutter dial tone condition, or be physically present to see a message waiting indicator.

Furthermore, remote retrieval by the called party while away from the office would be improved in that a called party would no longer have to call two disparate locations to hear messages, as all messages would ultimately be transferred to a called party location.

Finally, a called party has a need for an alternative to purchasing additional phone lines to avoid busy signal condition for calling parties. Because of the limitations as to new telephone number availability and the added cost for even basic service for telephone lines, there is a need for a more economical solution that can give a more professional image for small businesses that can centralize messaging storage and retrieval in their own office. Typically, voice mail services are considerably less per month than the cost of even one additional local telephone number.

SUMMARY OF THE INVENTION

One objective of the disclosed invention is to utilize auditory stutter dial tones or other signals received along with the dial tone from the telephone line at a CPE communication device to initiate an automatic dial-out sequence, in response to receiving a message at an off-premises message location.

Another objective of the disclosed invention is to automatically connect a CPE communication device to the telephone line to establish communication with an off-premise message center.

Another objective of the disclosed invention is the automatic generation by the CPE communication device of necessary mailbox access information, once communication has been established, for the retrieval and storage of voice or other message information transferred from the off-premises message center to the CPE communication device.

It is another objective of the present invention to provide one centralized location for automatic message storage and retrieval that is more convenient for a called party while eliminating the possibility that an important caller might receive a busy signal.

It is a further objective of the present invention to enable for the incrementing of an incoming message counter in a CPE that counts the number of messages directly received at the CPE and also accumulates the number of messages transferred from an off-premises location and stored at the CPE thereby indicating at one location the total number of messages received.

It is a further objective of the present invention to disable a telephone apparatus connected to the CPE communication device while message transfer is taking place so that a called party cannot interrupt the message transfer from the off-premises message center to the CPE communication device by inadvertently taking the handset of the CPE communication device off-hook.

It is a further objective of the present invention to allow the called party to monitor a message being transferred from the off-premises message center to the CPE communication device while the transfer is occurring, particularly in the case of a voice message.

These and additional objectives and advantages will be readily apparent to those skilled in the art from the detailed description provided herein.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of the preferred embodiment when read in conjunction with the accompanying drawings, wherein:

DETAILED DESCRIPTION OF THE INVENTION

Figure 1:
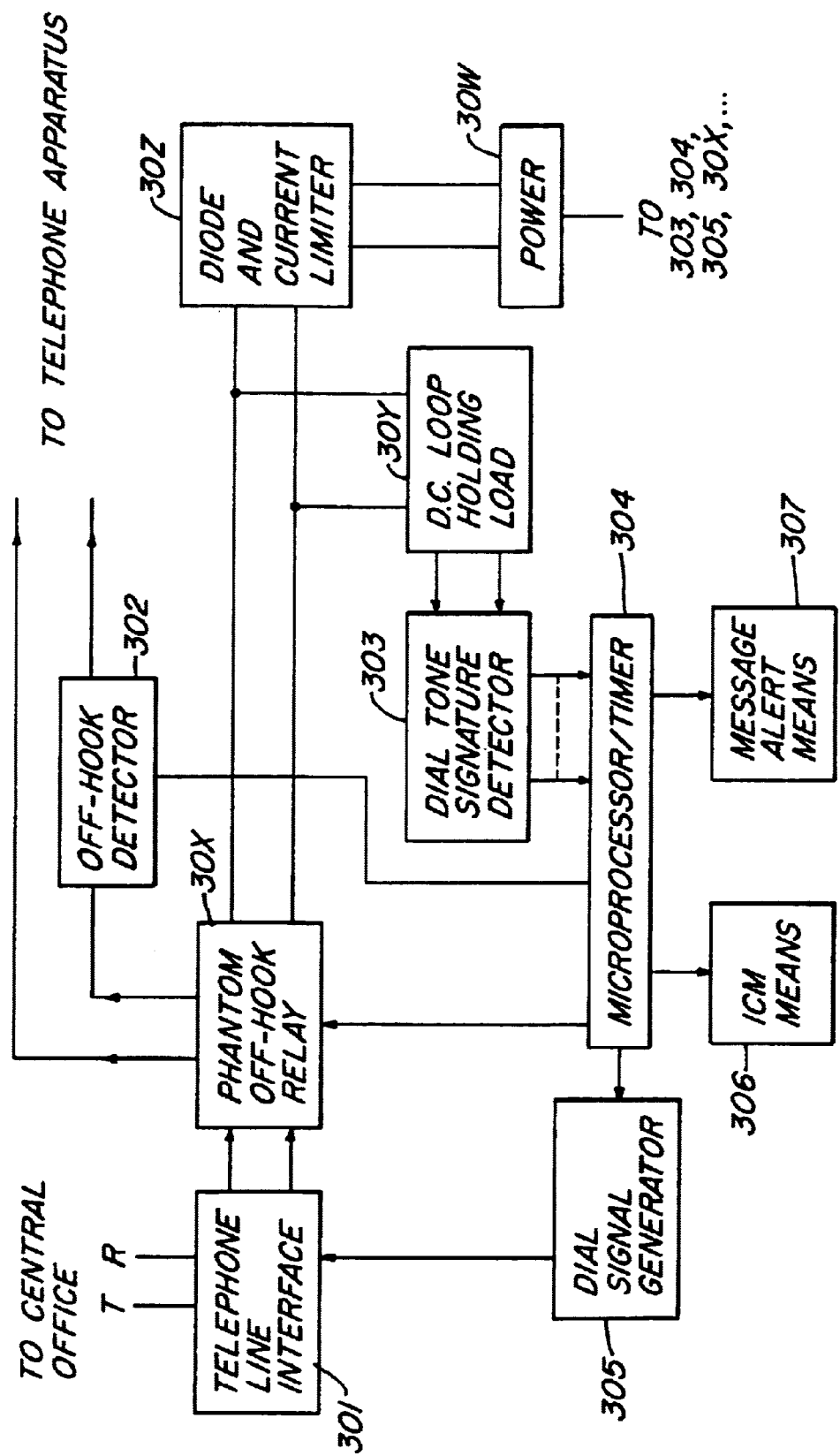
FIG. 1 illustrates a circuit diagram in accordance with the present invention.

Now referring to the drawings and initially to FIG. 1, an Automatic Message Retrieval (AMR) circuit in accordance with the present invention is connected with a pair of external telephone lines via telephone line interface 301. The AMR circuit may be in a separate apparatus externally connected between the telephone line and the CPE (customer premises equipment) communication device such as a conventional telephone answering machine, fax machine, or personal computer with voice/fax/data modem. Alternatively, the AMR circuitry may be integrated within the CPE communication device rather than a separate adjunct device.

Furthermore, in the case of a CPE communication device that includes integral AMR circuitry, the called party may selectively disable or enable the function of the AMR circuitry, depending upon whether or not the called party subscribes to voice mail or fax mail services provided by the central office of the telephone exchange or some other off-premises message service. For example, in the case where the called party does not use any external voice mail or fax mail message service in conjunction with the CPE communication device, it may be desirable to disable the AMR circuitry by choosing a particular menu selection which is software driven by the microprocessor, or by pressing a switch selection on the CPE communication device.

The Automatic Message Retrieval (AMR) circuit in its most basic form comprises a telephone line interface 301, a microprocessor/timer means 304, a phantom off-hook relay 30x, an off-hook detector 302, a dial tone signature detector 303, a dial signal generator 305, a switch for enabling incoming message storage means 306, a DC loop holding 30y, diode and current limiter 30z, and power 30w.

The dial signal generator 305 can include memory for prestored telephone number access data for the off-premises message center, PIN or mailbox data, and other necessary control data to establish communication between the CPE communication device and the off-premises message center.

The power 30w can be current from an external power supply or from a power supply from within an integrally connected communication device such as a TAD, facsimile or personal computer. Power 30w may also be a battery or capacitor that is periodically recharged with DC current from the telephone line.

Dial tone signature detector 303 can detect audible tones such as are found in the normal voice band (typically 300–3000 Hz), such as the normal and stutter dial tone or inaudible tones of frequencies outside of the normal voice band. Alternatively, the dial tone signature detector 303 can be programmed to recognize particular cadences, spacing between tones, or sequences of tones or frequencies as generated by the central office and preprogrammed within the dial tone signature detector 303. Dial tone signature detector 303 can be, as an example, a bank of LM 565 or equivalent integrated circuits, one for each frequency to be identified. The dial tone signature detector 303 detects tone frequencies of sets of frequencies and gives microprocessor 304 a yes/no or 1/0 status during reception of tone sets.

The microprocessor 304 analyzes the frequency and duration of tone sets and repetition rate and compares the current signature to a known tone timing signature(s) stored in memory, and then selects an appropriate alert signal via message alert means 307 and initiate dial signal generator 305. Message alert means 307 may include any combination of audible, visible, tactile or other notification events such as a IR or RF paging signal via a local paging center, or via connection to a paging center through the telephone network. In addition, the messaging alert means can include a buffer storage for receiving caller id data or fax header data or e-mail address data transferred from the voice or fax mail center or e-mail center (off-premises message center) and associated with a particular voice or fax or e-mail message record. The called party can view this information on a display and scroll through various message header records transferred and stored prior to hearing (in the case of a voice message), or viewing (in the case of a fax or e-mail message) the associated data message. The header record data can be stored in a buffer area for display and logically associated with the message data which is stored in a separate memory, or may be stored in a contiguous memory along with the message data in the CPE communication device.

The microprocessor also times the period between and the duration of the phantom off-hook relay 30x activation for tone signature testing and battery recharging. The AMR circuit can be remotely programmed (i.e., via the Local Switching Station or manufacturer/vendor) to meet local standards. In this case, the microprocessor would require electrically alterable, nonvolatile memory to support various programming options.

The phantom off-hook relay 30x is a low power two pole double through relay that is well known in the art and is connected to the DC loop holding load 30y that can be a 200–1000 ohm resistor.

The off-hook detection 302 is done via opto-coupler, whose diode senses the DC loop holding or AC ringing current as is well known in the art. In the case where either a called party is engaged in a conversation, or where a ringing signal is being supplied by a caller, the microprocessor 304 inhibits the phantom off-hook relay 30x and the tone signature detector 303 operation while the DC loop or AC ringing current is present so that a current calling party will not be interrupted. Periodically, or in response to receiving an on-hook condition signal, the microprocessor can then engage the phantom off-hook relay 30x, and tone signature detector 303, to ascertain if a stutter dial tone or other unique dial tone signature is presented from the telephone line interface 301.

If the microprocessor/timer 304 determines that, for example, a stutter dial tone is present, the off-hook condition is maintained and dial signal generator 305 is initiated to establish communication with the off-premises message center (voice or fax mail center). Dial signal generator accesses a prestored memory that contains the access number for the off-premises message center, necessary to establish communication between the CPE communication device and the off-premises message center. After establishing communication and accessing the appropriate mailbox, new messages can be retrieved and transferred to the CPE communication device.

In the case of voice messages stored at a voice mail center located off-premises, an incoming message storage means 306 is enabled and the voice messages are replayed and recorded at the CPE communication device. In the case of a fax message received at a fax mail center located off-premises, the incoming message storage means and fax message storage means in the CPE communication device that could receive any new fax messages transferred from the fax mail service. Similar modem decoding means could be initiated and employed for other data types such as e-mail. In this way, a centralized, unified messaging system can be implemented at the customer location while allowing for messages to be received during a busy condition.

If, on the other hand, it is determined by the AMR circuit that a normal dial tone is present, the circuit returns to a standby condition and the CPE communication device is placed back on-hook to await the next call. The microprocessor will not further interrogate the dial tone using dial done signature detector 303, or phantom off-hook relay 30x, until after the occurrence of an off-hook condition either manually initiated by the called party placing an outbound call, or by establishment of an off-hook condition after receipt of a calling signal and elapse of a ringing counter means to record an incoming message, as is well known in the art.

In either case above, it may be assumed by the microprocessor that another incoming call may have been directed to the off-premises message center during the off-hook condition when communication was occurring with another party. The microprocessor/timer 304 would then determine the status of the dial tone signature by interrogating the dial tone as described hereinbefore.

In an alternative embodiment, block 303 becomes a zero cross-over detection circuit and microprocessor 304 monitors the time between each positive and negative going zero cross-over and determines the tone frequencies, nature of tone sets, duration of tone sets, repetition rate of tone sets, and then utilizes dial signal generator 305 to establish communication with an off-premises message center.

Figure 2:
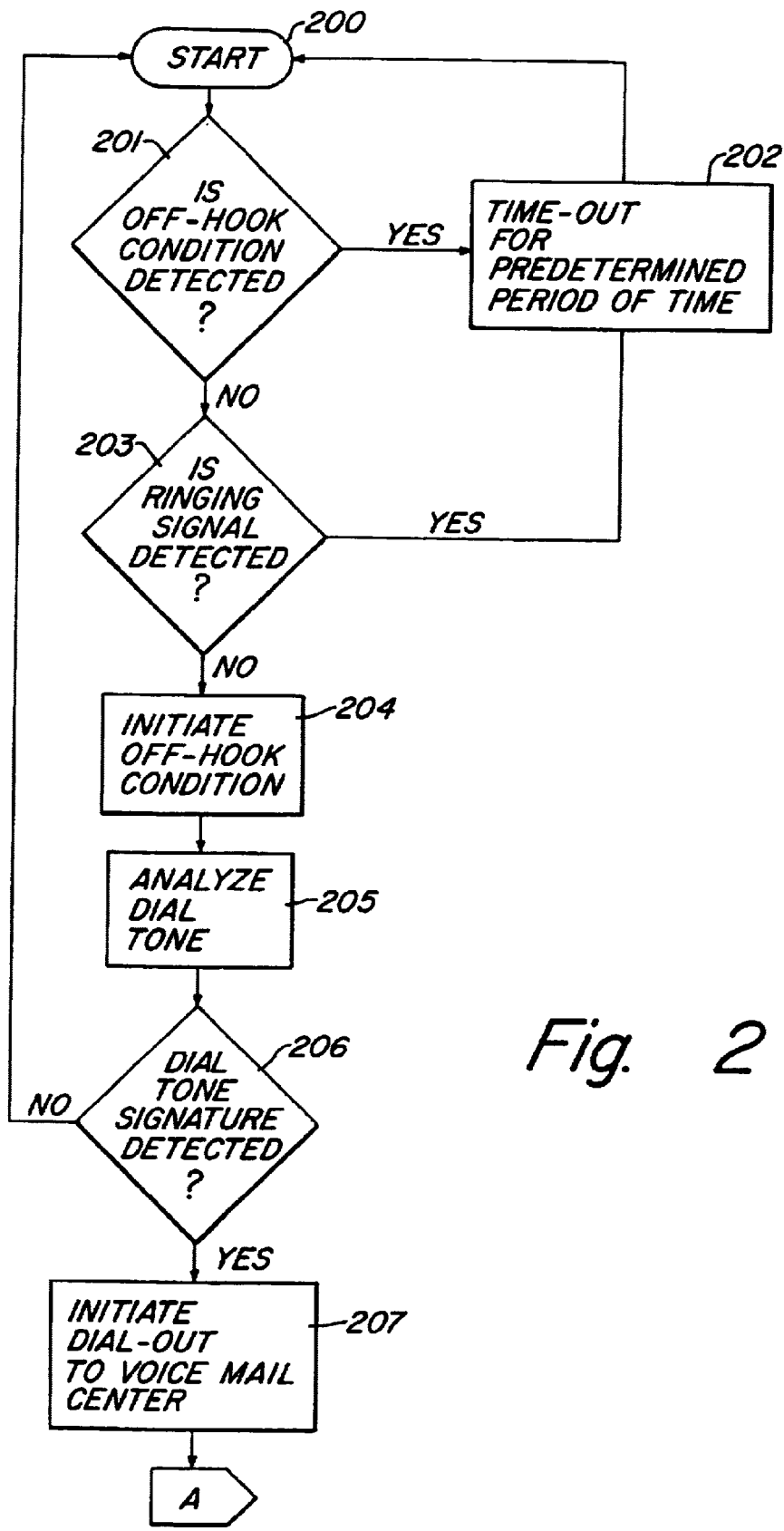
FIG. 2 illustrates a flow diagram of a preferred embodiment of the present invention for detecting a dial tone signature and initiating an automatic dialing sequence.

Referring now to FIG. 2, described is the operation in the preferred embodiment of how AMR circuit is initiated.

In step 201, the AMR circuit monitors if an off-hook condition is detected. If there is an off-hook condition detected, then a time out occurs for a predetermined period of time as shown in block 202. This time out could be for a few seconds to a few minutes, either predetermined or selectable by the user. Or more practically, the time out could continue until such time as the AMR circuit detected an on-hook condition. Then at that time, upon sensing that the CPE device was placed back on-hook, the circuit could automatically proceed to block 203 where a test was made to determine if a ringing signal was present. In the case where no off-hook condition is detected, a test is also made to determine if a ringing signal is present, as in block 203. If a ringing signal happens to occur at that time, the circuit operation proceeds back to block 202 wherein a time-out as previously discussed occurs. If no ringing signal is detected in block 203, then an off-hook condition is created automatically by the circuit block 204.

After initiation of an off-hook condition in 204, the circuit analyzes the dial tone in block 205 and employs a signature detector in block 206. At this point, the circuit compares known dial tone signatures that indicate a message waiting condition with the dial tone signature received in block 205. For example, assume the case where a stutter dial tone is generated by the central office off-premises message center to indicate a new message is waiting. If the dial tone is found to be a stutter dial tone from circuit operations in blocks 205 and 206, then a dial-out is automatically initiated utilizing the dial signal generator previously discussed in FIG. 1 to establish communication between the CPE communication device and the off-premises message center and circuit operation proceeds to connector A. If on the other hand, a normal dial tone signature is found in this example, then the circuit operation returns to block 200.

Figure 3:
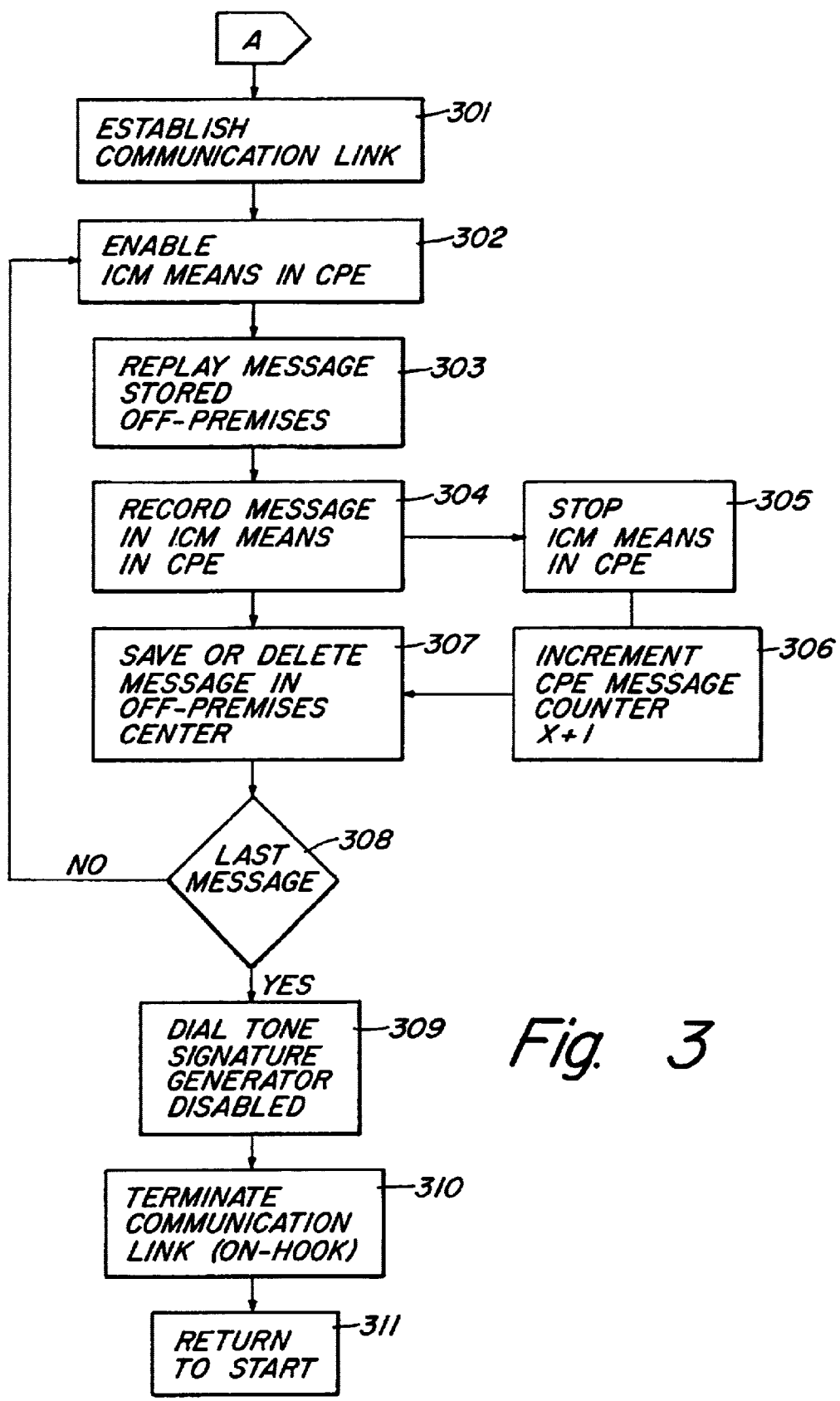
FIG. 3 illustrates a flow diagram of one embodiment of the present invention which shows how message transfer occurs from an off-premises message center to a CPE communication device.

Referring to FIG. 3, connector A picks up from FIG. 2, wherein block 301 is shown the operation that describes establishing the communication between the CPE communication device and the off-premises message center (voice, fax or e-mail center). Various data can be solicited by the off-premises center of the CPE communication device and delivered back to the off-premises center by the CPE communication device utilizing the dial signal generator 305 previously discussed in FIG. 1. Then, upon successful completion at block 301, an incoming message means suitable for voice messages, fax or other message data is enabled at the CPE in block 302 and the off-premises message center replays the messages as in block 303, to be recorded in the incoming message storage means at the CPE communication device as in block 304.

Upon successful transfer of the message data record, (which may include caller identification), ANI, e-mail address or fax header record data along with any associated voice, facsimile or e-mail message data), the incoming message means in the CPE communication device is stopped as in block 305.

Then, in block 306, any incoming message counter is incremented X+1, the transferred message still also residing at the off-premises message center is either saved or deleted as in block 307, and a determination is made whether the last new message has been transferred to the CPE communication device from the off-premises message center as in block 308.

If the last message has not been transferred from the off-premises message center, the circuit operation returns to block 302 wherein the incoming message storage means is enabled again at the CPE communication device in block 302 and the transfer process repeats as described earlier.

If the last message has been transferred from the off-premises message center, the circuit operation continues to block 309, wherein the dial tone signature generator and AMR is terminated and the termination of the communication link between the CPE communication device and the off-hook premises message center occurs and an on-hook condition as in block 310. Then finally, in block 311, the circuit operation returns to start, at FIG. 2, block 200.

Figure 4:
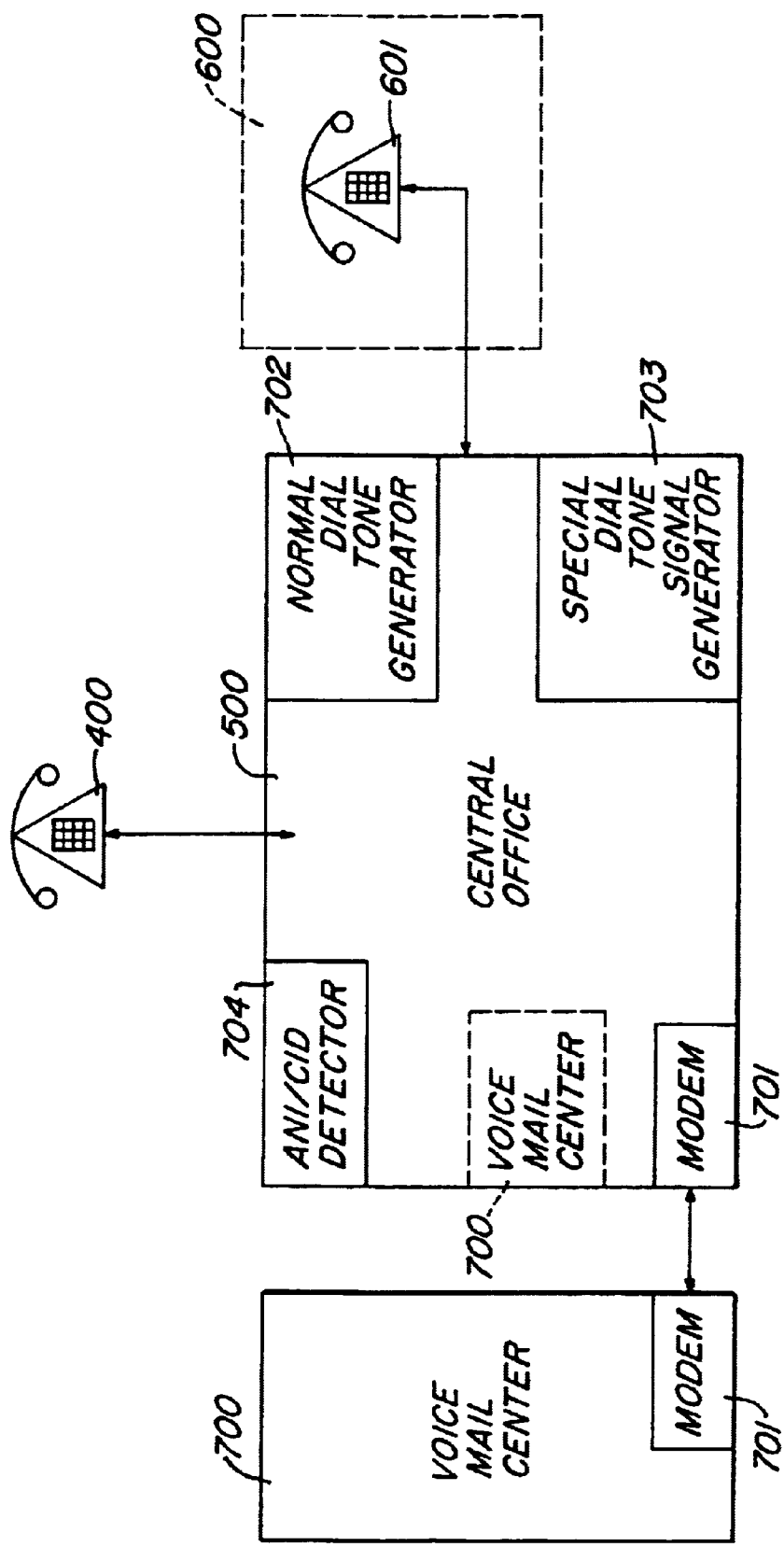
FIG. 4 illustrates a block diagram of a system according to the present invention which employs a CPE communication device, a central office of the telephone network with an off-premises message center, and a calling party.

Referring now to FIG. 4, calling party 400 initiates a call via central office 500 to called party location 600. Central office 500 contains a suitable ANI, FSK signal caller id decoder, fax or e-mail modem suitable for receiving caller identifying data that can be used as a textual header record along with message data received. Voice mail center 700 may also include fax or other communication data receiving and storing means and may be connected to central office 500 via modem communication 701, or may be integrally connected as depicted in the alternative embodiment annotated with dashed lines. Central office also contains normal dial tone signal generator 702. This signal generator delivers a normal dial tone to a calling party upon going off-hook, as is well known in the art. Additionally, central office 500 contains a special dial tone signal generator that generates, for example, a stutter dial tone in response to receiving a message for storage in voice mail center 700. As previously described, a calling party 400 initiates a call via central office 500. Upon detection by central office 500, that called party 600 is engaged in a busy condition, and CPE communication device 601 is in an off-hook condition, the calling party 400 is automatically directed to voice mail center 700, as is well known in the art. Any caller identification data received between the first and second ringing signal, or wik signal as supplied via an inbound trunked connection and ANI billing data, or fax or e-mail header record appended to and preceding a or e-mail message data, can be captured by ANI/CID detector 704 and logically or physically associated with any subsequent message data received by calling party 400. Typically, voice mail center 700 generates an outgoing message in case of a voice communication, and then the voice mail center records a voice message from the calling party, as is also well known in the art. After the calling party 400 hangs up and ends the attempted communication, the central office, in response to receiving a new message, generates a stutter dial tone or other dial tone signature data from special dial tone signature generator 703. When the called party location 600 returns on-hook again, the CPE communication device with the AMR circuit described in FIGS. 1–3 automatically interrogates the dial tone signature after initiating an off-hook condition. The circuit operation then continues as previously described and, as depicted in FIG. 1, a message alert means 307 is enabled upon successful transfer of any new message from the voice mail center 700 to the CPE communication device 601. As previously described, the message alert means could be an audible alert, visible lights or textual displays of caller identifying message header records, or tactile alerting means.

Then, upon noticing the alerting means 307 in the CPE communication device 601, the called party may listen to voice or read facsimile or e-mail textual messages. The called party may also view how many total messages were received, as determined by the directly received and transferred messages. In one preferred embodiment, the handset and hooks which attached to the CPE communication device (for example, a facsimile device) is disabled so that a called party cannot inadvertently corrupt any data transmission during transfer from the off-premises message center (voice or fax mail center 700).

In another preferred embodiment, the handset is partially disabled so that the called party can only hear the message while it is being transferred, which allows a called party to monitor new messages while they are being transferred to the CPE communication device from the off-premises message center (voice or fax mail center). The mouthpiece of the handset at the CPE communication device is muted in this case.

The called party can selectively delete, rewind, or skip particular messages heard during the transfer process while monitoring, by entering suitable DTMF codes from the CPE communication device to the off-premises message center.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended clams will cover any such modifications or embodiments that fall within the scope of the invention.

What is claimed is:

1. A communication system, comprising:
   (a) a communication device which may be selectively coupled to a communications network to allow communication between a called party and a calling party and which may be utilized to initiate communication and to receive communication:
   (b) a first message recordation system associated with said communication device for recording messages and located proximate to said communication device;
   (c) a second message recordation system located remotely from said communication device for recording messages; and
   (d) an automatic message retrieval system operable in a plurality of modes of operation including:
      (1) a message alert mode of operation during which the existence of a recorded message on said second message recordation system is detected by said automatic message retrieval system;
      (2) a communication establishment mode of operation during which communication is established over said communications network between said automatic message retrieval system and said second message recordation system when the recorded message is detected by the automatic message retrieval sum; and
      (3) a message transfer mode of operation during which messages recorded on said second message recordation system are copied to said first message recordation system for later retrieval by the called party.

2. A communication system according to claim 1, wherein said first message recordation system is integrated into said communication device.

3. A communication system according to claim 1, wherein said first message recordation system is not integrated into said communication device.

4. A communication system according to claim 1, wherein each of said first and second message recordation system is utilized to record at least one of:
   (a) voice messages;
   (b) facsimile messages; and
   (c) e-mail message.

5. A communication system according to claim 1, wherein said communication establishment mode of operation includes communicating password information to said second message recordation system in order to allow authorized access to said second message recordation system.

6. A method of communication, comprising:
   (a) providing a communication device which may be selectively coupled to a communications network to allow communication between a called party and a calling party and which may be utilized to initiate communication and to receive communication:
   (b) providing a first message recordation system associated with said communication device for recording messages and located proximate to said communication device;
   (c) providing a second message recordation system located remotely from said communication device for recording messages;
   (d) detecting the existence of a recorded message on said second message recordation system by an automatic message retrieval system;
   (e) establishing communication over said communications network between said automatic message retrieval system and said second message recordation system, when the recorded message is detected; and
   (f) copying messages recorded on said second message recordation system to the first message recordation system for later retrieval by the called party.

7. A method of communicating according to claim 6, wherein said first message recordation system is integrated into said communication device.

8. A method of communicating according to claim 6, wherein said first message recordation system is not integrated into said communication device.

9. A method of communicating according to claim 6, wherein each of said first and second message recordation systems is utilized to record at least one of:
   (a) voice messages;
   (b) facsimile messages; and
   (c) e-mail message.

10. A method of communicating according to claim 6, wherein said automatic retrieval system is utilized in communicating password information to said second message recordation system in order to allow authorized access to said second message recordation system.

11. A communication system, comprising:
    (a) a communication device for selectively coupling to a communications network to allow communication between a called party and a calling party;
    (b) a first message recording system associated with said communication device for recording messages for the called party;
    (c) a second message recording system coupleable to the communication network for recording messages for the called party; and
    (d) an automatic message retrieval system associated with the first message recording system and including;
       1. means for detecting a recorded message on said second message recording system;
       2. means for establishing communication over said communications network between said first message recording system and said second message recording system, when the recorded message is detected on the second recording system; and 3. means for transferring messages recorded on said second message recording system, when a recorded message is detected, to the first message recording system for later retrieval by the called party.

12. The communicating system according to claim 11, wherein said communication network provides a preselected dial tone signature to the communication device when there is a recorded message on the second message recording system and the means for detecting a recorded message on said second message recording system comprises:

means for initiating an off hook condition on the communication device; and means for detecting the preselected dial tone signature during the initiated off hook condition.

13. The communicating system according to claim 12, wherein the means for detecting a recorded message on said second message recording system further comprising a off hook detector means for detecting when the communication device is in use.

14. The communicating system according to claim 12, wherein the means for detecting a recorded message on said second message recording system further comprising a ring detector means for detecting if a called is being received by the communication device.

15. A method of communication, comprising:

(a) selectively coupling a communication device to a communications network to allow communication between a called party and a calling party;

(b) recording messages for the called party on a first message recording system associated with said communication device;

(c) recording messages for the called party on a second message recording system coupleable to the communication network for; and (d) detecting a recorded message on said second message recording system;

(e) establishing communication over said communications network between said first message recording system and said second message recording system, when the recorded message is detected on the second recording system; and (f) transferring messages recorded on said second message recording system to the first message recording system for later retrieval by the called party.

16. The method according to claim 15, further comprising: providing a preselected dial tone signature by the communication network to the communication device when there is a recorded message on the second message recording device and the step of detecting a recorded message on said second message recording system comprises:

initiating an off hook condition on the communication device; and detecting the dial tone signature during the initiated off hook condition.

17. The method according to claim 16, wherein the step of detecting a recorded message on said second message recording system further comprising the step of:

detecting when the communication device is in use.

18. The method according to claim 16, wherein the step of detecting a recorded message on said second message recording system further comprising the step of:

detecting if a call is being received by the communication device.

* * * * *

UNITED STATES PATENT AND TRADEMARK OFFICE
CERTIFICATE OF CORRECTION

PATENT NO. : 6,724,867 B1 Page 1 of 1
DATED : April 20, 2004
INVENTOR(S) : Henderson It is certified that error appears in the above-identified patent and that said Letters Patent is hereby corrected as shown below:

Column 8,
Line 40, delete "wik", replace "wink"

Column 9,
Line 54, delete "sum", replace "system"

Column 10,
Lines 3 and 45, delete "message", replace "messages"

Column 11,
Line 3, delete "and"
Lines 8, 19 and 24, delete "communicating", replace "communication"

Signed and Sealed this

Thirty-first Day of August, 2004

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,724,867 B1 | Page 1 of 1 |
| APPLICATION NO. | : 09/412250 | |
| DATED | : April 20, 2004 | |
| INVENTOR(S) | : Daniel A. Henderson | |

It is certified that error appears in the above-identified patent and that said Letters Patent is hereby corrected as shown below:

<u>Claim 1</u>
Colum 9, Line 43; after "system" add -- in said communication device --

Column 9, Line 47, after "detected" add -- using particular message alert signature --

<u>Claim 6</u>
Column 10, Line 23, after "detecting" add -- using particular message alert signatures --

Column 10, Line 25, after "system" add -- located in said communication device --

<u>Claim 11</u>
Column 10, Line 64, replace "1." with -- (i) --

Column 10, Line 65, after "system" add -- using particular message alert signatures --

Column 10, Line 66, replace "2." with -- (ii) --

Column 11, Line 4, replace "3." with -- (iii) --

<u>Claim 15</u>
Column 12, Line 3, replace "; and" with --:--

Column 12, Line 4, replace "(d)" with -- (i) --

Column 12, Line 5, after "system" add -- using particular message alert signatures --

Column 12, Line 6, replace "(e)" with -- (ii) --

Column 12, Line 11, replace "(f)" with -- (iii) --

Signed and Sealed this

Eighth Day of August, 2006

JON W. DUDAS
*Director of the United States Patent and Trademark Office*